INVENTORS
DAVID E. GIELOW
PETER M. LLEWELLYN
BY
ATTORNEY

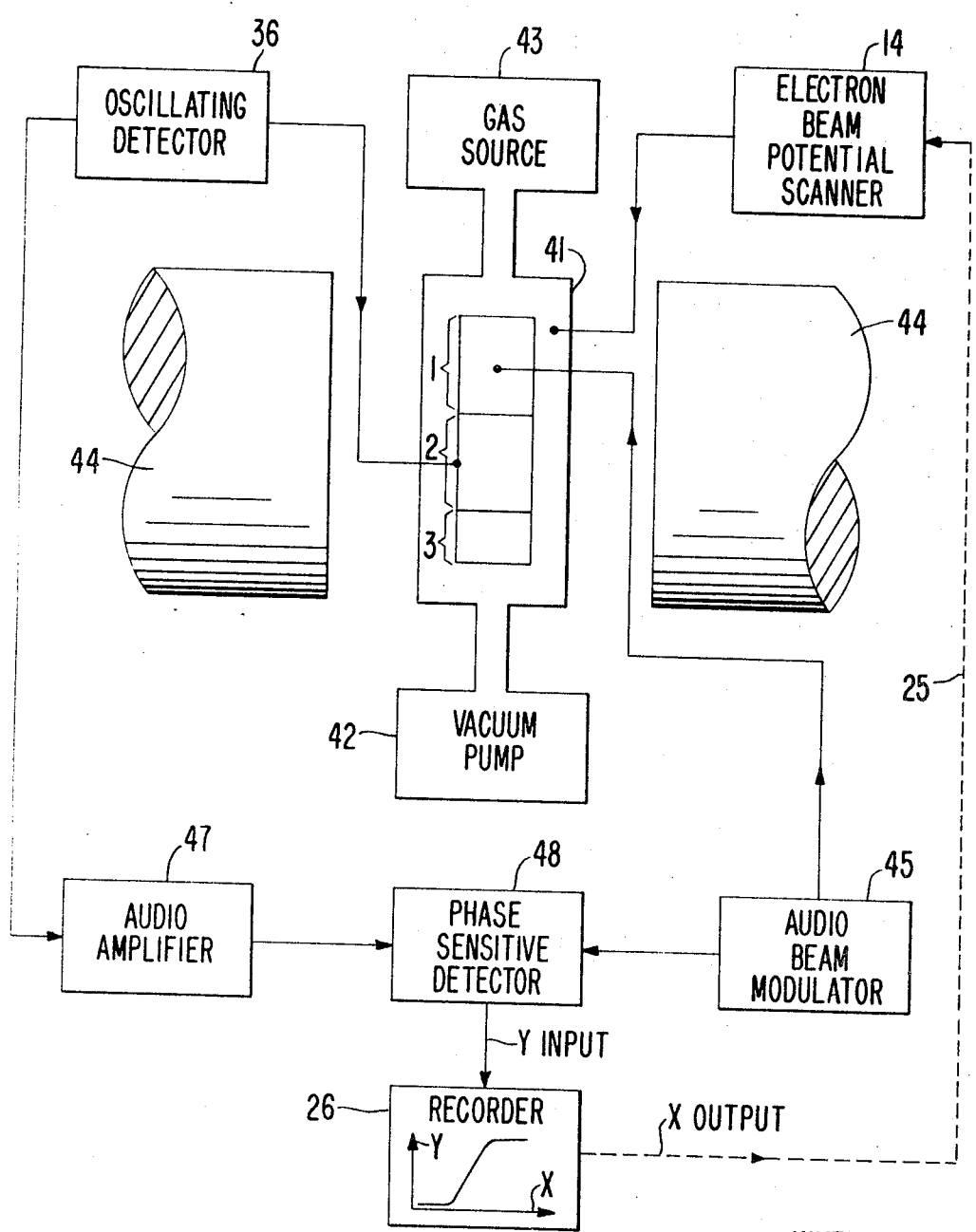

United States Patent Office 3,446,957
Patented May 27, 1969

3,446,957
ION CYCLOTRON RESONANCE SPECTROMETER EMPLOYING MEANS FOR RECORDING IONIZATION POTENTIALS
David E. Gielow, Los Altos, and Peter M. Llewellyn, Menlo Park, Calif., assignors to Varian Associates, Palo Alto, Calif., a corporation of California
Filed May 2, 1967, Ser. No. 635,513
Int. Cl. B01d 59/44
U.S. Cl. 250—41.9                           3 Claims

ABSTRACT OF THE DISCLOSURE

An ion cyclotron resonance spectrometer is disclosed having means for recording the ionization potential for various species of ions. The spectrometer includes an ion source region in which a beam of electrons is projected through an electrode structure for ionizing gas therein and for producing a beam of ions. The electron beam voltage is variable and is swept over a predetermined range of beam voltages to ionize certain gaseous substances in the source over a range of beam potentials (ionizing potentials). The ion beam is projected into an analyzer region which applies a radio frequency electric field with a component orthogonal to a D.C. magnetic field for exciting and detecting cyclotron resonance of a predetermined species of ion. The cyclotron resonance signal is proportional to the number of the predetermined species of ion in the analyzer region. The resonance signal intensity is recorded as a function of the ionizing electron beam potential. An extrapolation of the recorded trace to the base line yields the ionization (appearance) potential which is useful for identifying certain ions and gases. In a preferred embodiment, the recorder X-axis drive mechanically drives a potentiometer for sweeping the ionizing beam voltage and the resonance signal is recorded on the Y-axis input of the recorder.

Description of the prior art

Heretofore, ion cyclotron resonance spectrometers have been built. Such a spectrometer is described and claimed in copending U.S. application Serial No. 456,173 filed May 17, 1965, and assigned to the same assignee as the present invention. Such a spectrometer is useful as a mass spectrometer for many gases and for observing various ion-molecules and unimolecular reactions. However, the prior art ion cyclotron resonance spectrometer did not include means for determining ionization potentials for the various gases. Such ionization potential information is useful for identifying certain gases.

Summary of the present invention

The principal object of the present invention is the provision of an improved ion cyclotron resonance spectrometer.

One feature of the present invention is the provision, in an ion cyclotron resonance spectrometer, of a sweep circuit for sweeping the beam voltage of the ionizing electron beam and recording the cyclotron resonance signal as a function of the swept beam voltage to obtain a recording from which the ionization potential of the resonant ion species is readily ascertained.

Another feature of the present invention is the same as the preceding feature wherein the ionizing beam potential is swept by a potentiometer driven from the X-axis drive of the recorder.

Other features and advantages of the present invention will become apparent upon perusal of the following specification taken in connection with the accompanying drawings wherein:

Brief description of the drawings

FIG. 3 is a schematic block diagram of a spectrometer incorporating features of the present invention.

Description of the preferred embodiments

Figure 1:
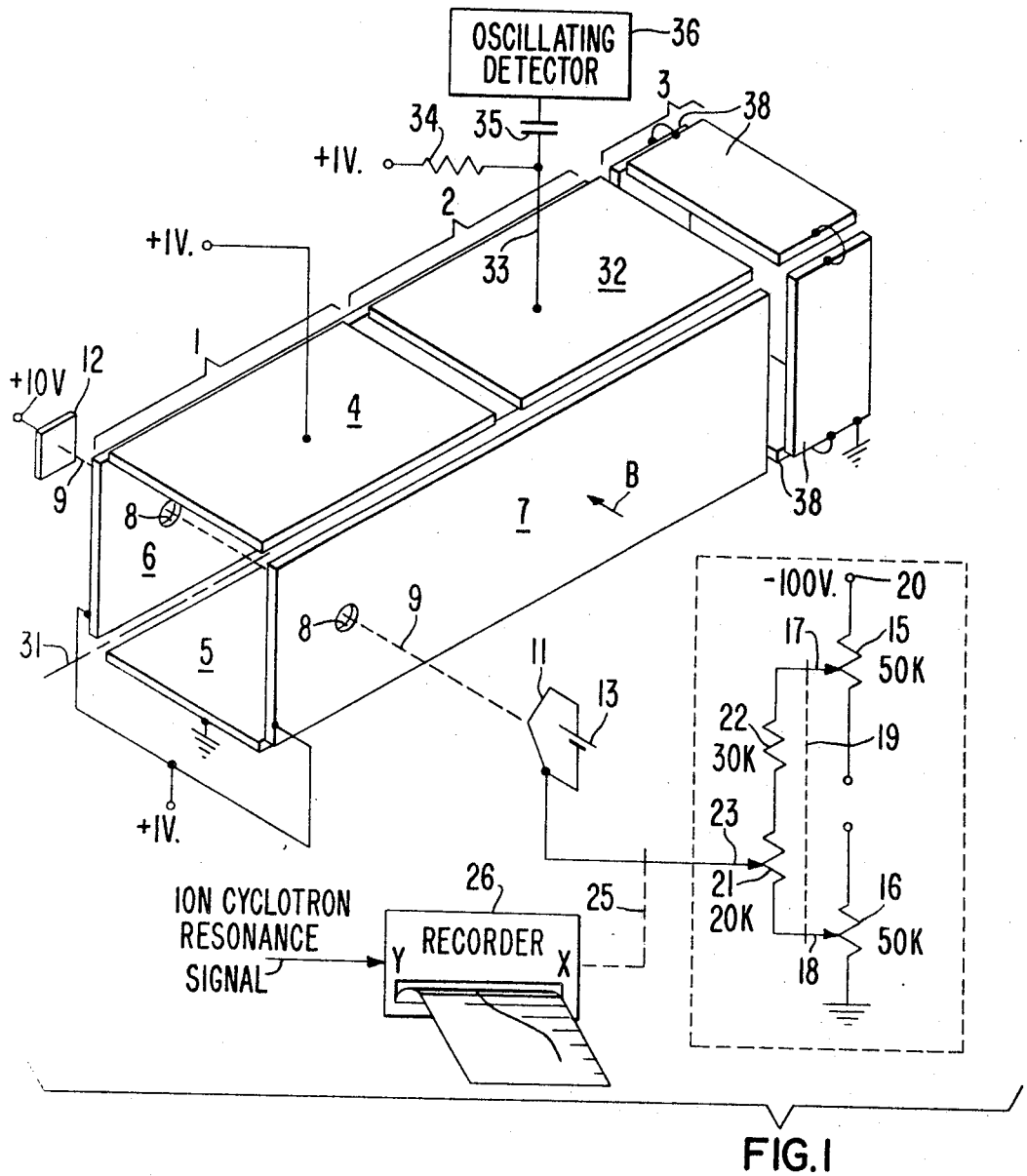
FIG. 1 is a perspective view, partly in schematic diagram form, of a portion of spectrometer incorporating features of the present invention.

Referring now to FIG. 1, there is shown the electrode structure and certain associated circuitry incorporating features of the present invention. The electrode structure comprises a generally hollow rectangular structure having an ion source region 1 at one end, an ion collector region 3 at the other end and an ion cyclotron resonance or analyzing region 2 therebetween.

In the ion source region 1, a pair of top and bottom plates 4 and 5 are closed on their sides by a pair of side plates 6 and 7. The bottom plate 5 is grounded and the top plate 4 is operated at a small positive potential as of +1 v. relative to the bottom plate 5. The side plates 6 and 7 are operated at the same potential as the top plate.

The side plates 6 and 7 include a pair of aligned apertures 8 through which an ionizing electron beam 9 is projected from a filamentary thermionic emitter 11 to an electron collector electrode 12. The collector 12 is operated at a slight positive potential relative to the side plates 6 and 7, as of +10 v. A filament power supply 13 supplies heating current to the emitter 11.

A scan circuit 14 serves to scan the beam potential of the ionizing electron beam 9 over a selected predetermined range of potentials. The scan circuit 14 includes a pair of potentiometers 15 and 16, as of 50KΩ each, series connected together via their pickoffs 17 and 18 with another potentiometer 21, and a fixed resistance 22. The third potentiometer 21 and the fixed resistance 22 have a total resistance of 50KΩ which is equal to the resistance of either one of the series connected potentiometers 15 and 16. A constant current source 20 having a voltage as of −100 v. and a current as of 1 milliampere is connected across the series connected potentiometers to ground. The pickoffs 17 and 18 are ganged together via mechanical linkage 19. Pickoff 23 of the third potentiometer 21 is connected to the filamentary emitter 11 for establishing the beam potential of the ionizing electron beam 9.

The ionizing beam potential is established by the potential between the side plates 6 and 7 and the potential of the emitter 11. The side plates 6 and 7 operate at a fixed +1 v. above ground and the emitter 11 operates at a selected voltage below ground as, for example, any selected value between 0 to −70 volts by the settings of potentiometers 15, 16 and 21. More specifically, by adjusting the ganged settings of potentiometers 15 and 16 by mechanical linkage 19, any start scan potential from 0 to −50 volts is obtainable. The beam potential is then scanable an additional 20 volts by adjusting potentiometer 21.

Actually, the true ionizing beam potential must take into account the +1 v. relative to ground applied to the side plates 6 and 7. Therefore, +1 volt must be added to the beam potentials as read from the potentiometer settings.

By making the resistances of the potentiometers 15 and 16 equal and making the resistance of potentiometer 21 plus that of resistor 22 equal to the resistance of each of the potentiometers 15 and 16, the resistance of the scan circuit 14 does not change with a change in its output. Therefore, the scan is linear over its operating range.

The beam potential is scanned from its selected starting voltage by a mechanical linkage 25 forming a part of a graphic X-Y recorder 26. The mechanical linkage 25 is coupled to the X-axis drive mechanism of the X-axis channel of the recorder. For example, the mechanical linkage 25 may comprise the shaft, not shown, which drives a capstan which takes up a cord to move the recording pen along the X-axis.

Ions produced in the source region 1 are projected along a beam path 31 axially of the electrode structure into the analyzer region 2. In the analyzer region, a top plate electrode 32 has a small +1 v. D.C. bias applied relative to the grounded bottom plate 5 via lead 33 and R.F. isolating resistor 34. Also, a radio frequency potential at the cyclotron resonance frequency, for a selected ion species in the magnetic field B, is applied across plates 32 and 5 via lead 33 and D.C. blocking capacitor 35.

Figure 2:
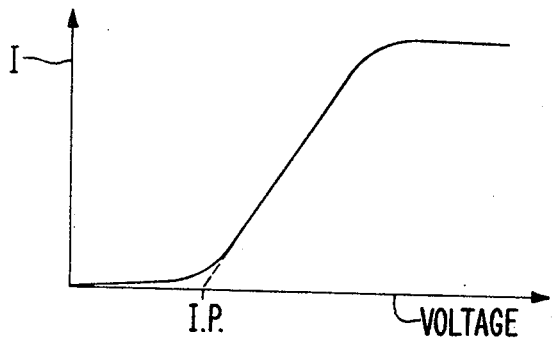
FIG. 2 is a recording obtained from the recorder of FIG. 1.

The applied R.F. potential is derived from an oscillating detector 36 which excites and detects ion cyclotron resonance of those ion species resonant at the tuned operating frequency of the oscillating detector 36. The resonant conditions of magnetic field B or R.F. frequency or both can be changed for selected detection of various ion species, as desired. The detected ion cyclotron resonance signal, which has an amplitude proportional to the number of such ions produced per unit time, is fed to the Y-axis channel of the recorder 26 for recording as a function of the ionizing beam potential. The result is a recording, as shown in FIG. 2, from which ionization potential can be ascertained by extrapolating the slope of the curve to the base line, as indicated by the dotted line and point identified as I.P.

The ion beam 31 passes through the analyzer region 2 and is collected by a four sided electrode structure 38.

Referring now to FIG. 3, there is shown the ion cyclotron resonance spectrometer incorporating features of the present invention. The electrode structure of FIG. 1 is disposed in an evacuable envelope 41 evacuated to a desired pressure within the range of $10^{-2}$ torr to $10^{-8}$ torr via getter-ion vacuum pump 42. A gas source 43 leaks sample gas to be analyzed into the envelope 41 at a desired rate. The envelope 41 and electrode structure is immersed in a strong unidirectional magnetic field B produced by a magnet 44.

The oscillating detector 36 excites and detects ion cyclotron resonance of a selected ion species. The oscillating detector 36 is typically tunable over a frequency range from 80 kHz. to 765 kHz. The ion beam intensity is modulated at a convenient low audio frequency, as of 40 Hz., via audio beam modulator 45 which modulates the D.C. bias voltage applied to the top plate 4 in the ion source 1.

The cyclotron resonance signal, as detected by oscillating detector 36, is, thus, audio modulated, due to the beam modulation, and is fed to an audio amplifier 47 and thence to one input of a phase sensitive detector 48. A sample of the audio beam modulation signal is obtained from the audio modulator 45 and fed to the other input terminal of the phase sensitive detector 48 wherein it is compared with the resonance signal to give a D.C. resonance output signal. The D.C. resonance signal is fed to the Y-axis of the recorder 26 for recording as a function of the scan of the ionizing beam voltage. The beam voltage is scanned by the mechanical linkage 25 to the electron beam potential scanner 14 which scans the beam potential, as previously described.

Although the electrode structure of FIG. 1 has been described as it is employed for positive ion analysis, it may be used for negative ion analysis by reversing the sign of the potential applied to electrode plates 6, 7, 4 and 32 and by reversing the sign of the magnetic field B.

Since many changes could be made in the above construction and many apparently widely different embodiments of this invention can be made without departing from the scope thereof it is intended that all matter contained in the above description or shown in the accompanying drawings shall be interpreted as illustrative and not in a limiting sense.

What is claimed is:

1. In an ion cyclotron resonance spectrometer, means for ionizing gaseous materials and including an electron beam which is projected at a certain beam potential through the gaseous material to be analyzed for ionizing same, means for exciting and selectively detecting ion cyclotron resonance of the ionized gaseous materials in a unidirectional magnetic field, the improvement comprising, means for scanning the beam potential of the ionizing electron beam over a range of beam potentials, and means for recording the selectively detected ion cyclotron resonance of a certain selected species of ion as a function of the scanned ionizing beam potential to obtain a recording from which the ionization potential of the selected ion species can be ascertained.

2. The apparatus of claim 1 wherein said means for scanning the beam potential over a range of beam potentials includes a potentiometer for deriving the scanned beam potential, said recorder including a first and second channel for recording information along first and second axes in mutually orthogonal relation on a recording medium, and means forming a mechanical coupling between said first channel of said recorder and said potentiometer for correlating the scan of the beam voltage with the beam voltage information recorded by said recorder.

3. The apparatus of claim 2 including, means passing a constant current through the resistance of said potentiometer.

References Cited

UNITED STATES PATENTS 3,244,876    4/1966    Kanda et al.
3,355,587    11/1967    Jenckel.

RALPH G. NILSON, *Primary Examiner.*

A. L. BIRCH, *Assistant Examiner.*

U.S. Cl. X.R.

250—106; 324—33